United States Patent
Ishida

(10) Patent No.: US 9,366,303 B2
(45) Date of Patent: Jun. 14, 2016

(54) TRACTOR

(71) Applicant: ISEKI & CO., LTD., Ehime-ken (JP)

(72) Inventor: Tomoyuki Ishida, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 36 days.

(21) Appl. No.: 14/307,881

(22) Filed: Jun. 18, 2014

(65) Prior Publication Data

US 2014/0379226 A1 Dec. 25, 2014

(30) Foreign Application Priority Data

Jun. 19, 2013 (JP) .................................. 2013-128747

(51) Int. Cl.

| | |
|---|---|
| *F16D 67/06* | (2006.01) |
| *B60T 1/06* | (2006.01) |
| *B60T 7/04* | (2006.01) |
| *B60T 7/12* | (2006.01) |
| *B60T 13/66* | (2006.01) |
| *F16H 61/02* | (2006.01) |
| *F16H 37/04* | (2006.01) |

(52) U.S. Cl.
CPC ................. *F16D 67/06* (2013.01); *B60T 1/062* (2013.01); *B60T 7/042* (2013.01); *B60T 7/12* (2013.01); *B60T 13/662* (2013.01); *F16H 61/0246* (2013.01); *F16H 2037/049* (2013.01)

(58) Field of Classification Search
CPC ....... F16D 67/06; B60T 1/062; B60T 13/662; B60T 7/12; B60T 7/042
USPC ......................................... 701/50, 71, 78, 83
See application file for complete search history.

(56) References Cited

U.S. PATENT DOCUMENTS

| | | | |
|---|---|---|---|
| 3,999,641 A | 12/1976 | Luttrell | |
| 4,694,942 A | 9/1987 | Ogano et al. | |
| 2007/0125614 A1 | 6/2007 | Sato et al. | |
| 2007/0255476 A1* | 11/2007 | Takamatsu ................ | B60T 8/00 701/78 |
| 2014/0121921 A1* | 5/2014 | Long ................... | F16H 61/0031 701/60 |
| 2015/0239452 A1* | 8/2015 | Iwasa .................... | B60W 10/06 701/22 |

FOREIGN PATENT DOCUMENTS

| | | |
|---|---|---|
| JP | 2010-257231 | 11/2010 |
| JP | 2012-116301 | 6/2012 |

OTHER PUBLICATIONS

Extended European Search Report issued Nov. 13, 2014 in the corresponding European Application No. 14172902.0.
First Examination Report issued Jun. 23, 2014 in corresponding New Zealand Application No. 626298.

* cited by examiner

*Primary Examiner* — Nga X Nguyen
(74) *Attorney, Agent, or Firm* — Wenderoth, Lind & Ponack, L.L.P.

(57) ABSTRACT

A tractor, including: an engine; a forward/backward movement clutch which is provided on a motive power transmission route from the engine to one or more traveling apparatuses, and is configured to carry out changes among forward movement, backward movement, and neutral; one or more brake pedals; and a control unit which is configured to allow, in association with stepping manipulation of the one or more brake pedals, one or more brakes to operate on the one or more traveling apparatuses and allow operating-pressure of the forward/backward movement clutch to lower.

1 Claim, 13 Drawing Sheets

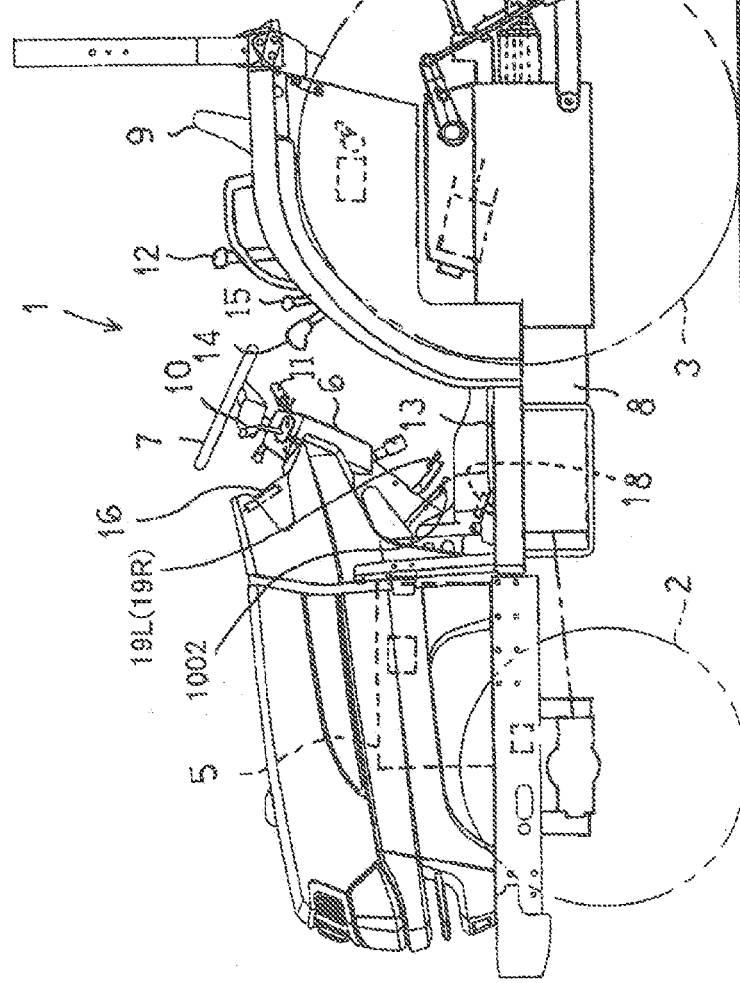
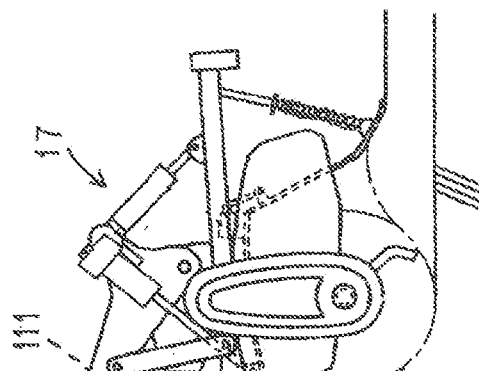
FIG.1A
FIG.1B

TRACTOR

BACKGROUND OF THE INVENTION

1. Field of the Invention

The present invention relates to a tractor which is an agricultural machine and, particularly, relates to a braking controlling apparatus in the tractor.

2. Related Art of the Invention

In a tractor, for transmitting motive power of the engine to traveling apparatuses such as front wheels, rear wheels and the like, inside the motive power transmission apparatus plural clutches, speed-changing apparatuses and the like are provided. In the machine body an accelerator pedal, brake pedals and a clutch pedal are provided. It is ordinary that on the occasion of traveling stopping, the brakes are allowed to be effective with the brake pedals stepped on and the clutch is allowed to be off with the clutch pedal stepped on. However, during traveling with traveling and stopping frequently performed, since it is bothersome to frequently perform off manipulation of the clutch and brake manipulation, performed are that the clutch is allowed to be automatically off only with brake manipulation so that the machine body is allowed to stop, and that the clutch is allowed to be automatically in the on state only with the brake pedals opened and the brakes released so that traveling is enabled to be performed.

For example, in the braking controlling apparatus of the working vehicle according to Japanese Patent Application Publication No 2012-116301, a configuration is disclosed in which in association with stepping manipulation of the brake pedals the motive power transmission clutch of the motive power transmission apparatus is allowed to automatically carry out off operation so as to allow vehicle stopping to be carried out for the machine body.

SUMMARY OF THE INVENTION in the said braking controlling apparatus of the working vehicle, since the joining pressure of the oil hydraulic multiple disc clutch is allowed to be zero on the occasion when, in association with stepping of the brake pedals, an off action of the oil hydraulic multiple disc clutch is automatically performed, the joining response of the oil hydraulic multiple disc clutch is bad when the machine body next allowed to launch, and there is a problematic point that the launching is delayed.

Hereupon, in the present invention, a tractor is furnished which is capable of smoothly performing the traveling and stopping with manipulation of one or more brakes.

The $1^{st}$ aspect of the present invention is a tractor, comprising:

an engine (5);

a forward/backward movement clutch (48) which is provided on a motive power transmission route from the engine (5) to one or more traveling apparatuses (3), and is configured to carry out changes among forward movement, backward movement and neutral;

one or more brake pedals (19L, 19R); and a control unit (120) which is configured to allow, in association with stepping manipulation of the one or more brake pedals (19L, 19R), one or more brakes (135) to operate on the one or more traveling apparatuses (3) and allow operating-pressure of the forward/backward movement clutch (48) to lower.

The $2^{nd}$ aspect of the present invention is a tractor according to the 1st aspect of the present invention, comprising one or more sensors (123L, 123R) which are configured to detect the stepping manipulation of the one or more brake pedals (19L, 19R), wherein the control unit (120) is configured, to allow, response to detection result of the one or more sensors (123L, 123R), the one or more brakes (135) to operate on the one or more traveling apparatuses (3) and allow the operating pressure of the forward/backward movement clutch (48) to lower.

The 3rd aspect of the present invention is a tractor according to the $2^{nd}$ aspect of the present invention, wherein when a machine body is in a traveling stopping state, the forward/backward movement clutch (48) is held with operating-pressure of a predetermined low pressure.

The $4^{th}$ aspect of the present invention is a tractor according to the $3^{rd}$ aspect of the present invention, wherein the operating pressure of the predetermined low pressure is set higher, as a speed-changing position of an auxiliary speed-changing lever (15) is at a higher speed position.

The $5^{th}$ aspect of the present invention is a tractor according to the $4^{th}$ aspect of the present invention, wherein on an occasion when the stepping manipulation of the one or more brake pedals (19L, 19R) is released, the operating-pressure of the forward/backward movement clutch (48) is restored to total pressure.

The $6^{th}$ aspect of the present invention is a tractor according to the $5^{th}$ aspect of the present invention, wherein a pressure raising rate of restoring the operating-pressure of the forward/backward movement clutch (48) to the total pressure is set higher, as the speed-changing position of the auxiliary speed-changing lever (15) is at a higher speed position.

The $7^{th}$ aspect of the present invention is a tractor according to the $6^{th}$ aspect of the present invention, wherein in case, after the stepping manipulation of the one or more brake pedals (19L, 19R) is released, stepping manipulation of an accelerator pedal (18) is performed, then the operating-pressure of the forward/backward movement clutch (48) is restored to the total pressure with a pressure raising rate which is higher than the pressure raising rate on the occasion when, after the stepping manipulation of the one or more brake pedals (19L, 19R) is released, the stepping manipulation of the accelerator pedal (18) is not performed.

In the $1^{st}$ aspect of the present invention, in case stepping manipulation of the brake pedals 19L and 19R is carried out, then the operating-pressure is allowed to lower with the forward/backward movement clutch 48 not allowed to be completely off. And, the one or more brakes 135 operate on the one or more traveling apparatuses.

Like this, since the operating-pressure is allowed to lower with the forward/backward movement clutch 48 not allowed to be completely off, in a case where traveling is started from a stopping state, since the forward/backward movement clutch 48 promptly joins completely, smooth launching can be carried out.

In the $2^{nd}$ aspect of the present invention, since the sensors 123L and 123R are utilized, smooth launching can be securely carried out.

In the $3^{rd}$ aspect of the present invention, in case stepping manipulation of the brake pedals 19L and 19R is carried out, then the operating-pressure is allowed to lower with the forward/backward movement clutch 48 not allowed to be completely off and the pressure is held with a low pressure. And, the one or more brakes 135 operate on the one or more traveling apparatuses.

Like this, since a low pressure is operating on the forward/backward movement clutch 48 even in case the machine body is stopping, in a case where traveling is started from a stopping state, since the forward/backward movement clutch 48 promptly joins completely, smoother launching can be carried out.

In the 4$^{th}$ aspect of the present invention, since, as the speed-changing position of the auxiliary speed-changing lever 15 is at a higher speed position, the operating-pressure of the predetermined low pressure is set higher, the target speed becomes able to be attained faster even in case the speed being a target is a higher speed.

In the 5$^{th}$ aspect of the present invention, since the operating-pressure of the forward/backward movement clutch 48 is restored to the total pressure on the occasion when the stepping manipulation of the brake pedals 19L and 19R is released, the target speed becomes able to be securely attained.

In the 6$^{th}$ aspect of the present invention, since the pressure raising rate of restoring, on the occasion when the stepping manipulation of the brake pedals 19L and 19R is released, the operating-pressure of the forward/backward movement clutch 48 to the total pressure is set higher as the speed-changing position of the auxiliary speed-changing lever 15 is at a higher speed position, the target speed becomes able to be attained faster even in case the speed being a target is a higher speed.

In the 7$^{th}$ aspect of the present invention, since in case, after the stepping manipulation of the brake pedals 19L and 19R is released, stepping manipulation of the accelerator pedal 18 is performed, then the operating-pressure of the forward/backward movement clutch 48 is restored to the total pressure with a pressure raising rate which is higher than the pressure raising rate on the occasion when the stepping mamipulation of the brake pedals 19L and 19R is simply released, the speed being a target can be promptly attained.

BRIEF DESCRIPTION OF THE DRAWINGS

FIG. 1A is a whole side view of a tractor of an embodiment of the present invention, and FIG. 1B is a plan view of the brake pedals and accelerator pedal portion of an embodiment of the present invention;

DESCRIPTION OF SYMBOLS

Figure 2:
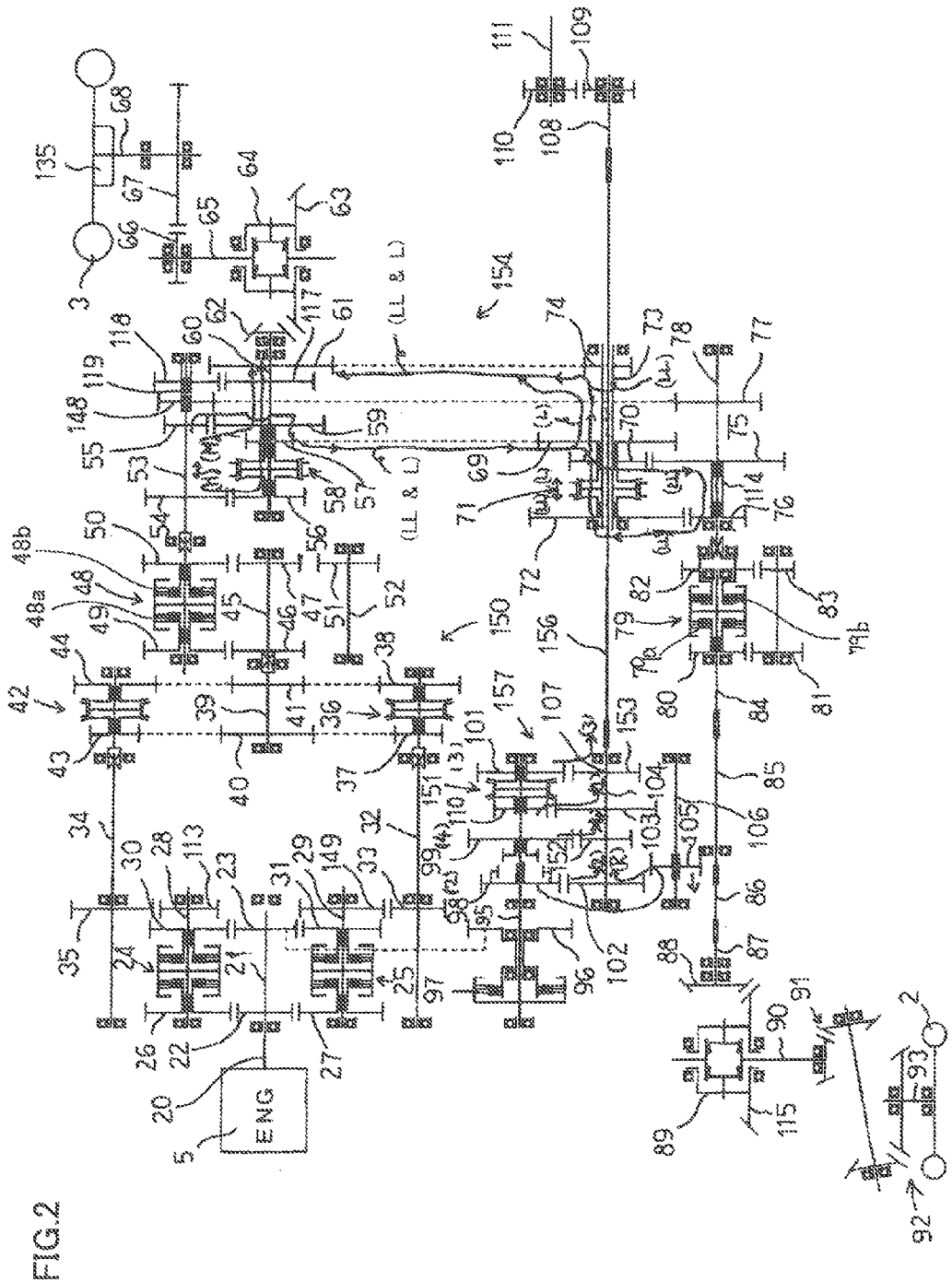
FIG. 2 is a motive power transmission line diagram from the engine to the front-and-rear wheels and the PTO shaft of an embodiment of the present invention.

2 front wheel
3 rear wheel
5 engine
14 main speed-changing lever
15 auxiliary speed-changing lever
18 accelerator pedal
19L left brake pedal
19R right brake pedal
48 forward/backward movement clutch
135 brake
146 reporting means (automatic-transmission displaying lamp)

PREFERRED EMBODIMENTS OF THE INVENTION

A practical example in a tractor as one example of the working vehicle is described in the following.

Additionally, in the present specification the left and right directions are said to be the left and the right respectively toward the forward movement direction of the working vehicle, the forward movement direction is said to be the forward, and the backward movement direction the backward.

The configuration is such that, as being shown in FIG. 1, the tractor 1 comprises the front wheels 2 and 2 and the rear wheels 3 and 3 at the front/rear parts of the machine body and is configured to appropriately reduce in speed, by the speed-changing apparatuses inside the transmission case 8, the rotation of the engine output shaft 20 of the engine 5 with which the front part of the machine body is equipped, so that this is transferred to the front wheels 2 and 2 and the rear wheels 3 and 3. Regarding the rear wheels 3 and 3, they may be crawlers.

On the handle post 6 at the machine body center the steering handle 7 is provided, and rearward thereof the seat 9 is provided. At a lower left side of the steering handle 7, the forward/backward movement lever 10 is provided which is configured to carry out changes of the movement direction of the machine body between the forward movement direction and the backward movement direction. The configuration is such that, in case this forward/backward movement lever 10 is shifted to the front side, then the machine body moves forward whilst the body moves backward in case the lever is shifted to the rear side. The configuration is allowed to be such that the forward/backward movement lever 10 can be manipulated with fingertips while the steering handle 7 is being gripped.

Because of this, the protruding part 10a of the forward/backward movement lever 10 which protrudes from the handle post 6 has the warped part 10b so as to go upward and has the gripping part 10c. Because of this, the portion of the gripping part 10c can be manipulated with fingertips in a state where the steering handle 7 is being gripped. In case the forward/backward movement lever 10 is slightly lifted up and displaced frontward, then the forward movement position is gained whilst the backward movement position is gained in case the forward/backward movement lever 10 is slightly lifted up and displaced rearward.

In addition, at the opposite side of the forward/backward movement lever 10 across the handle post 6, the accelerator lever 11 is provided which is configured to adjust the engine rotation speed and, in addition, provided at the right, corner part of the step floor 13 are the accelerator pedal 18 which is configured to similarly adjust the engine rotation speed, and the left brake pedal 19L and the right brake pedal 19R that are configured to allow the brakes 135 to operate with which the left and right rear wheels 3 and 3 are provided respectively.

The brake connection rod 94 is provided which, is configured to integrally connects the left brake pedal 19L and the right brake pedal 19R and in case either of the left brake pedal 19L and the right brake pedal 19R is stepped upon in a state where the connection with this brake connection rod 94 is carried out, then the traveling of the tractor 1 stops, the stopping controlling of which will be described later.

In case the brake connection rod 94 is allowed to be in a state of disconnection, then the left brake pedal 19L and the right brake pedal 19R become able to be independently used and, by carrying out stepping manipulation of the brake pedal of the turning innerside at the time of turning inside a farm field, turning can be carried out with the turning radius allowed to be small is manual brake turn).

At the opposite side of the left brake pedal 19L and right brake pedal 19R across the handle post 6, the clutch pedal 1002 is provided.

At the front side of the steering handle 7 on the upper part of the handle post 6 the front meter panel 16 shown in FIG. 1 is provided, and at the center part of this front meter panel 16 the liquid crystal displaying part 1001 is provided. At the left side of the liquid crystal displaying part 1001 the tachometer 136 is provided, and at the right side of the liquid crystal displaying part 1001 the displaying lamp panel 145 is provided.

Figure 7:
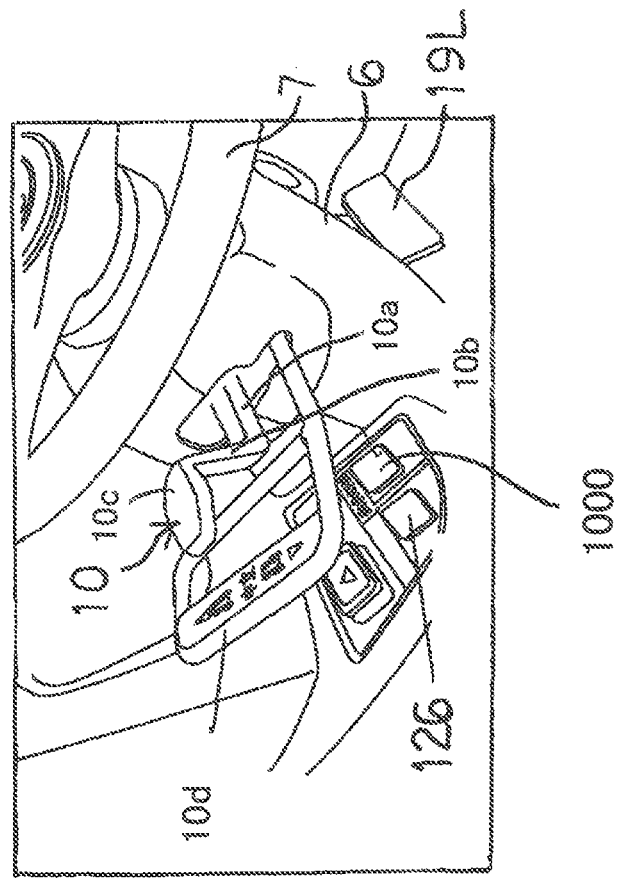
FIG. 7 is a left side part perspective view of the steering handle of an embodiment of the present invention.

The engine rotation speed is displayed on the tachometer 136, and on the displaying lamp panel 145 the automatic-transmission displaying lamp 146 and the low pressure warning lamp 147 are provided. As in FIG. 7, at a left lower part of the handle post 6 the automatic-transmission switch 126 is provided. At the right side of this automatic-transmission switch 126 the displaying changing switch 1000 is provided, and the configuration is allowed to be such that, every time pushing manipulation of this displaying changing switch 1000 is carried out, the details which are displayed on the said liquid crystal displaying part 1001 are changed.

In addition, the main speed-changing lever 14 which is configured to carry out speed-changing from the first speed to the eighth speed is placed at the left front side part of the seat 9, the auxiliary speed-changing lever 15 is placed rearward thereof which can select any of the positions of the four levels of the superlow speed, the low speed, the middle speed and the high speed, and the neutral, and further at the right side thereof the PTO speed-changing lever 12 is provided which is configured to carry out speed-changing of four levels.

At the machine body rear part of the tractor 1, the rotary cultivator 17 is installed, which is configured to be driven with the PTO output shaft 111 that protrudes rearward from the transmission case 8.

FIG. 2 is a transmission line diagram which shows the Motive power transmission mechanism of the speed-changing apparatuses inside the transmission case 8 where the front case 8F and the rear case SR are integrally assembled, and described is the speed changing transmission mechanism from the engine 5 to the front wheels 2 and rear wheels 3 and the PTO output shaft 111 to the rotary cultivator 17.

The rotation of the engine output shaft 20 of the engine 5 is transmitted to the input shaft 21 inside the transmission case 8. The first input gear 22 and the second input gear 23 anchored to this input shaft 21 mesh with the first low speed gear 26 of the first high-and-low clutch 24 and the second low speed gear 27 of the second high-and-low clutch 25, and the first high speed gear 30 of the first high-and-low clutch 24 and the second high speed gear 31 of the second high-and-low clutch 2 respectively so that the rotation is transmitted.

And, transmission is carried out from the first low speed gear 26 to the first clutch shaft 28 in case the first high-and-low clutch 24 is linked to the side of the first low speed gear 26, whilst transmission is carried out from the first high speed gear 30 to the first clutch shaft 28 in case the first clutch is linked to the side of the first high speed gear 30, and transmission is carried out from the second low speed gear 27 to the second clutch shaft 29 in case the second high-and-low clutch 25 is linked to the side of the second low speed gear 27, whilst transmission is carried out from the second high speed gear 31 to the second clutch shaft 29 in case the second clutch is linked to the side of the second high speed gear 31.

The first high-and-low clutch 24 and the second high-and-low clutch 25 are the same oil hydraulic multiple disc clutches, and are to carry out high-and-low two level speed-reduction of the rotation of the input shaft 21 with the same speed-reduction ratio so as to carry out the transmission to the first clutch shaft 28 and the second clutch shaft 29 respectively.

Figure 4:
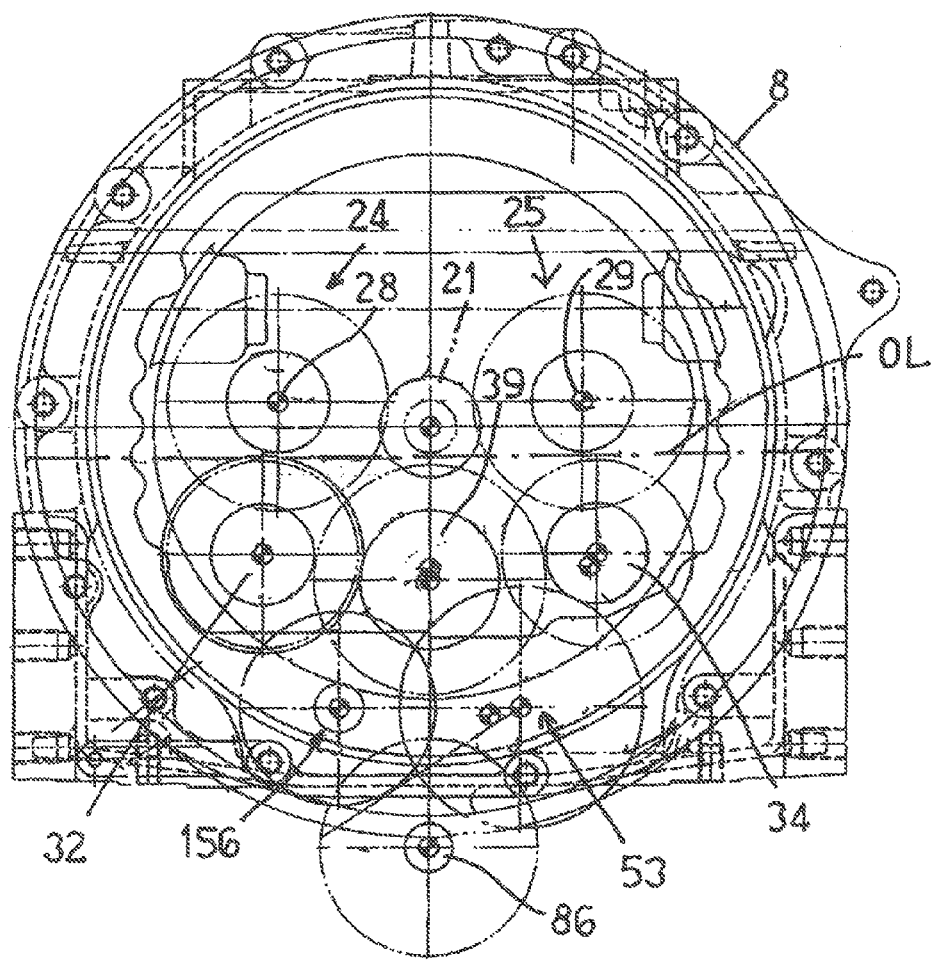
FIG. 4 is a front section view of the transmission case of an embodiment of the present invention.

In addition, as being shown in FIG. 4, the first high-and-low clutch 24 and the second high-and-low clutch 25 are immersed in lubrication oil, and the first clutch shaft 28 thereof and the second clutch shaft 29 are positioned a bit above the liquid face OL of the lubrication oil.

Figure 3:
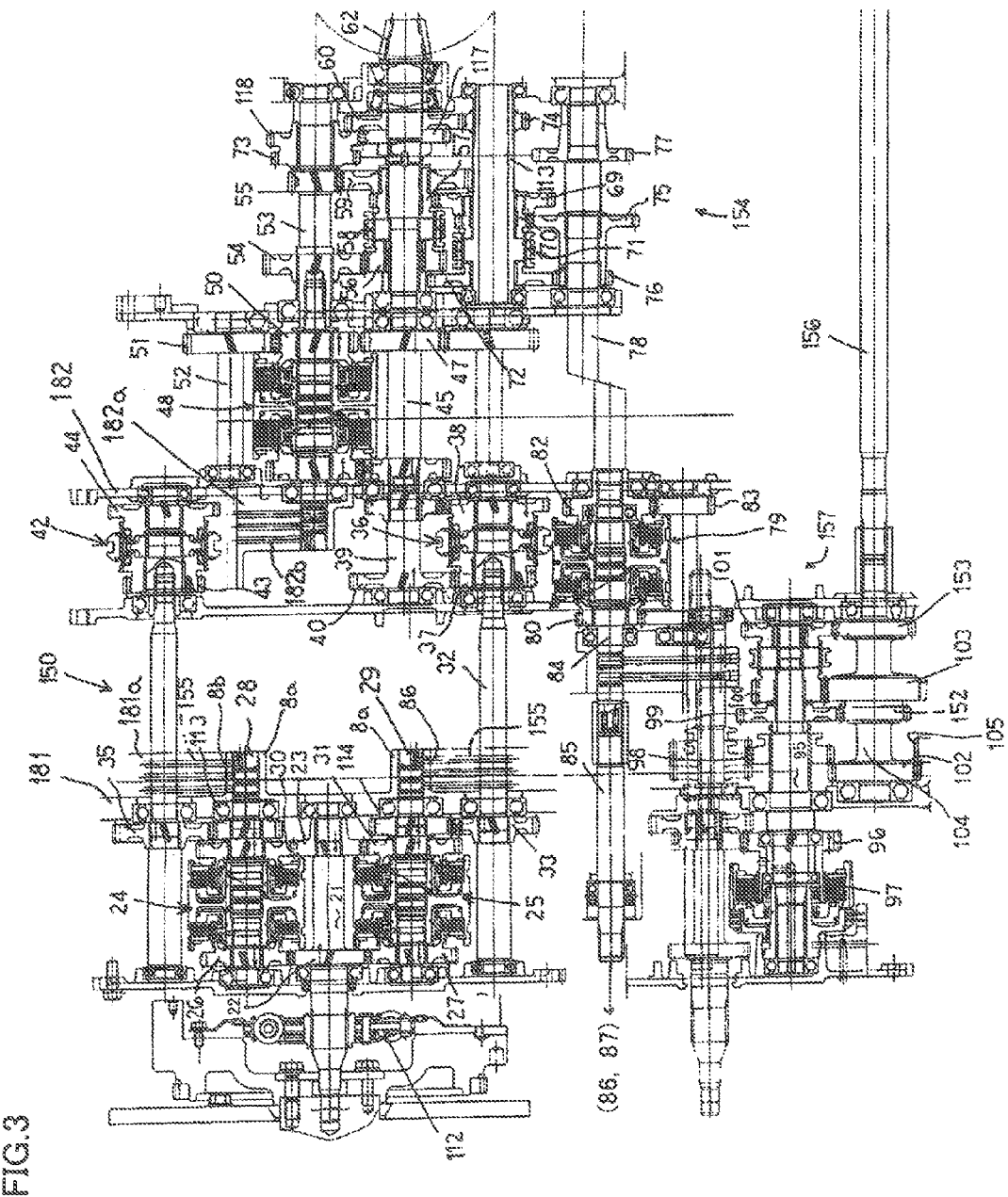
FIG. 3 is a sectional development view of the transmission case of an embodiment of the present invention.

In addition, as being shown in FIG. 3, in the thickened part 181a which is formed on the front partition wall 181 that supports the first clutch shaft 28 and the second clutch shaft 29 in the transmission case 8, the refueling hole 8b is provided which has been fabricated with a drill from the left and right opening part sides of the case, and from this refueling hole 8b refueling is carried out to the shafts of the first high-and-low clutch 24 and the second high-and-low clutch 25.

Figure 5:
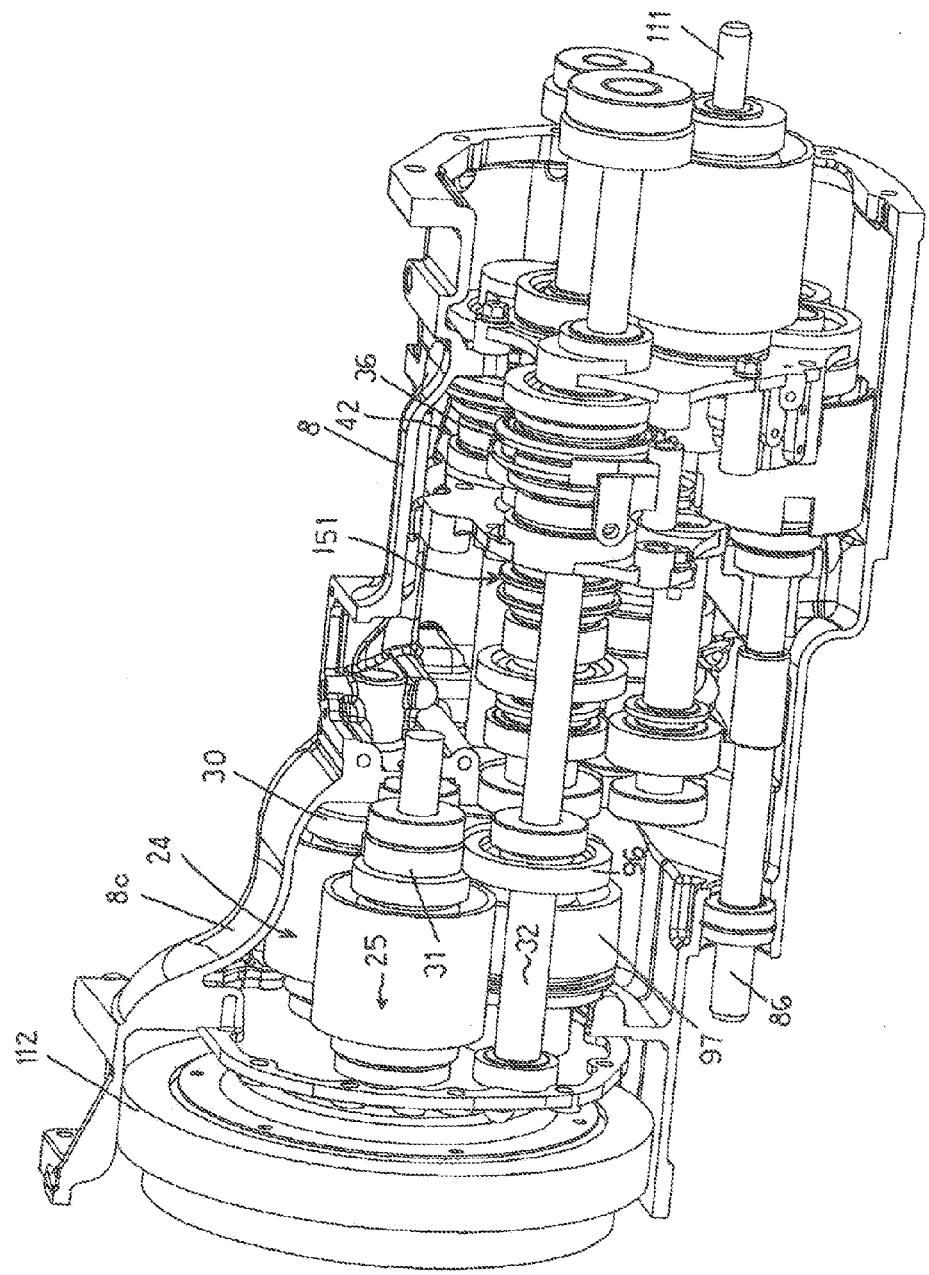
FIG. 5 is a sectional perspective view of the transmission case of an embodiment of the present invention.

In addition, as being shown in FIG. 5, the first high-and-low clutch 24 and the second high-and-low clutch 25 are arranged left and right, at a lower part of the downward sloping part 8c of the transmission case 8.

The first gear 113 anchored to the first clutch shaft 28 shown in FIG. 2 meshes with the second gear 35 anchored to the low speed transmission shaft 34 so that transmission is carried out with speed-reduction, and the third gear 149 anchored to the second clutch shaft 29 meshes with the fourth gear 33 anchored to the high speed transmission shaft 32 so that transmission is carried out with speed-increasing.

The speed-changing transmission so far allows speed-changing to be carried out, with two levels at the low speed for the low speed transmission shaft 34, and with two levels at the high speed for the high speed transmission shaft 32, and thereby speed-changing of four levels in total is to be carried out.

The rotations of the low speed transmission shaft 34 and the high speed transmission shaft 32 are transmitted to the first synchro-change 42 and the second synchro-change 36 respectively, and the first synchro-small-gear 43 of the first synchro-change 42 and the second synchro-small-gear 37 of the second synchro-change 36 mesh with the fifth gear 40 of the first transmission shaft 39, whilst the first synchro-large-gear 44 of the first synchro-change 42 and the second synchro-large-gear 38 of the second synchro-change 36 mesh with the sixth gear 41 of the first transmission shaft 39, so that transmission is carried out.

The first synchro-small-gear 43 and first synchro-large-gear 44 of the first synchro-change 42 and the second synchro-small-gear 37 and second synchro-large-gear 38 of the second synchro-change 36 are completely the same gears and, since the low speed transmission shaft 34 rotates with the low speed and the high speed transmission shaft 32 rotates with the high speed, speed-changing is carried out further with two levels at the low speed in case the first synchro-change 42 is changed, whilst speed-changing is carried out further with two levels at the high speed in case the second synchro-change 36 is changed. Namely, speed-changing of the rotation of the input shaft 21 is to be carried out at the first transmission shaft 39 with low speed four levels and high speed four levels.

The first synchro-change 42 and the second synchro-change 36 are settled in the transmission case 8 with subassembly of the shifter stay and the shifter, the case opening parts of the speed-changing manipulation part thereof being provided on the left and right side faces of the case, and are provided above the liquid face OL of the lubrication oil of the transmission case 8.

So far in the main speed-changing part 150, the speed-changing position of the main speed-changing lever 14 the manipulator manipulates is read, and with the traveling system ECU 120 the high-and-low oil hydraulic multiple disc clutches 24 and 25 and the first and second synchro-changes 42 and 36 are automatically controlled so that speed-hanging (eight level speed-changing) is carried out from the low speed four levels to the high speed four levels.

In addition, inside the transmission case 8, the first high-and-low clutch 24 and the second high-and-low clutch 25 are arranged left and right, arranged left and right therebelow are the low speed transmission shaft 34 on which the first synchro-change 42 is installed and the high speed transmission shaft 32 on which the second synchro-change 36 is installed, and thereby the configuration is enabled to be compact such that the left and right width of the transmission case 8 is narrow with the height being low.

Further, the first transmission shaft 39 is connected to the second transmission shaft 45 with shaft connection. To this second transmission shaft 45, the seventh gear 46 and the eighth gear 47 are anchored which are allowed to mesh with, respectively, the positive rotation clutch gear 49 of the forward/backward movement clutch 48 of oil hydraulic multiple discs and the reverse rotation gear 51 of the reverse rotation shaft 52, and the reverse rotation gear 51 meshes with the reverse rotation clutch gear 50 of the forward/backward movement clutch 48.

Accordingly, in case the forward movement clutch 48a of the forward/backward movement clutch 48 is joined and linkage to the positive rotation clutch gear 49 is carried out, then transmission is carried out in a positive rotation state (a forward movement) to the auxiliary speed-changing shaft 53 connected to the forward/backward movement clutch 48, whilst in case the backward movement clutch 48b of the forward/backward movement clutch 48 is joined and linkage to the reverse rotation clutch gear 50 is carried out, then transmission is carried out in a reverse rotation state (a backward movement) to the auxiliary speed-changing shaft 53. For the positive rotation and the reverse rotation the speed-reduction ratios are different, and the reverse rotation yields lower speed. In case the forward/backward movement lever 10 is allowed to be at the forward movement position, then the forward movement clutch 48a is joined, whilst in case the forward/backward movement lever 10 is allowed to be at the backward movement position, then the backward movement clutch 48b is joined.

In addition, in the thickened part 182a which is formed on the rear partition wall 182 that supports the supporting shat of the forward/backward movement clutch 48 in the transmission case 8, the refueling hole 182b is provided which has been fabricated with a drill from the case outerside of the case, and from this refueling hole 182b refueling is carried out to the supporting shaft of the forward/backward movement clutch 48.

Additionally, the refueling holes for the front wheel speed-increasing clutch 79 and the PTO main clutch 97 are also formed in the thickened parts which are provided on the innerside of the transmission case 8.

Next, the auxiliary speed-changing part 154 is described.

Anchored to the auxiliary speed-changing shaft 53 are the ninth gear 54 and tenth gear 55, which mesh with the third synchro-large-gear 56 and third synchro-small-gear 59 of the third synchro-change 58 respectively. Accordingly, in case the third synchro-change 58 is linked to the side of the third synchro-large-gear 56, then carried out is the speed-increasing of the fifth transmission shaft 6Q with rotation transmitted from the ninth gear 54 to the third synchro-large-gear 56 followed by the high speed driving, whilst in case the third synchro-change 58 is linked to the side of the third synchro-small-gear 59, then carried out is the speed-reduction of the fifth transmission shaft 60 with rotation transmitted from the tenth gear 55 to the third synchro-small-gear 59 followed by the middle speed driving.

Further, anchored to the side of the third synchro-small-gear 59 of the third synchro-change 58 is the eleventh gear 57, which meshes with the fourth synchro-small-gear 69 of the fourth synchro-change 71. And, to the side of the fourth synchro-small-gear 69 the fifteenth gear 70 is anchored, and this fifteenth gear 70 meshes with the seventeenth gear 75 of the second cylinder shaft 114 so that transmission is carried out from the eighteenth gear 76 anchored to the second cylinder shaft 114 to the fourth synchro-large-gear 72. To the first cylinder shaft 73 on which the fourth synchro-change 71 is installed, the sixteenth gear 74 is anchored.

Accordingly, in case the third synchro-change 58 is allowed to be neutral, then the rotation of the tenth gear 55 is transmitted to the third synchro-small-gear 59, and transmission is carried out from the eleventh gear 57 anchored to the side of the third synchro-small-gear 59 to the fourth synchro-small-gear 69.

In this state, in case the fourth synchro-change 71 is linked to the side of the fourth synchro-small-gear 69, then the rotation of the fourth synchro-small-gear 69 becomes the rotation of the sixteenth gear 74 so that the low speed is gained, whilst in case the fourth synchro-change 71 is linked to the side of the fourth synchro-large-gear 72, then the rotation of the fourth synchro-small-gear 69 is transmitted from the fifteenth gear 70 to the seventeenth gear 75, the eighteenth gear 76 and the fourth synchro-large-gear 72 so that the extremely low speed is gained at the sixteenth gear 74.

Additionally, in a case where the third synchro-change 58 is linked to the side of the third synchro-large-gear 56 or the side of the third synchro-small-gear 59, the fourth synchro-change 71 is allowed to be neutral.

Accordingly, for the low speed four levels and high speed four levels after the speed-changing at the main speed-changing part 150, speed-changing is carried out with four levels at the auxiliary speed-changing part 154, and thereby speed-changing of the low speed sixteen levels and high speed sixteen levels (32 levels in grand total) is to be carried out. By means of this, with charges of the forward/backward movement clutch 48, speed-changing of the forward movement 32 levels and backward movement 32 levels is gained.

Further, the sixteenth gear 74 meshes with the twelfth gear 61 anchored to the said fifth transmission shaft 60 and drives the fifth transmission shaft 60. The first bevel gear 2 anchored to the shaft end of this fifth transmission shaft 60 meshes with the second bevel gear 63 of the rear bevel case 64, and the rear wheel output shaft rotated with the bevel output shaft 65 of the rear bevel case 64 via the thirteenth gear 66 and the fourteenth gear 67 so that the rear wheels 3 are driven. At the left and right of the rear wheel output shaft 68 the brakes 135 are provided which operate with the right brake pedal 19R and the left brake pedal 19l, respectively.

In addition, to the fifth transmission shaft 60 the twenty-first gear 117 is anchored and, via the twenty-second gear 118 and twenty-fifth gear 148 anchored to the third cylinder shaft 119 which supported thereon by the auxiliary speed-changing shaft 53, transmission is carried out to the nineteenth gear 77 of the first front wheel driving shaft 78, so that the rotation of the said sixteenth gear 74 of the low speed sixteen levels and high speed sixteen levels is transmitted to the first front wheel driving shaft 78.

Via the front wheel speed-increasing clutch 79 transmission is carried out from this first front wheel driving shaft 78 to the second front wheel driving shaft 84, transmission is successively carried out to the third front wheel driving shaft 85, the fourth front wheel driving shaft 86 and the front wheel driving bevel shaft 87, the first front bevel gear 88 anchored to the shaft end of the front wheel driving bevel shaft 87 meshes with the second front bevel gear 115 of the front bevel case 89, and the front wheel output shaft 93 is rotated with the front bevel output shaft 90 of the front bevel case 89 via the first front bevel gear pair 91, the front vertical shaft and the second front bevel gear pair 92 so that the front wheels 2 are driven.

In case the speed-increasing clutch 79b of the front wheel speed-increasing clutch 79 is joined, then transmission is gradually carried out in line with the first speed-increasing clutch gear 82, the first speed-increasing gear 83, the second speed-increasing gear 81, the second speed-increasing clutch gear 80 and the second front wheel driving shaft 84 and, with this flow, transmission is gained which carries out speed-increasing of the front wheels with respect to the rear wheels. In case the 4WD clutch 79a of the front wheel speed-increasing clutch 79 is joined, then the rotation of the first speed-increasing clutch gear 82 is transmitted to the second front wheel driving shaft 84. With this flow, 4WD driving is gained which allows the front wheels to be of the same speed as the rear wheels. In a case where any of the said peed-increasing clutch 79b and the 4WD clutch 79a is not joined, 2WD traveling only with rear wheel driving is gained.

The auxiliary speed-changing part 154 reads the speed-changing position of the auxiliary speed-changing lever 15, and with the traveling system ECU 120 controlling of the third synchro-change 58 and fourth synchro-change 71 is automatically carried out so that speed-changing is carried out.

In addition, the first cylinder shaft 73 on which the fourth synchro-change 71 is installed is arranged below the fifth transmission shaft 60 on which the third synchro-change 58 is installed, and the length of the transmission case 8 is enabled be short. Regarding the third synchro-change 58 and the fourth synchro-change 71, the configuration may be such that joining to the auxiliary speed-changing lever 15 with a linkage mechanism and the like is carried out so as to give a mechanical changer.

Next, the transmission route of the PTO output shaft 111 is described.

With the said second input gear 23 the main clutch gear 96 of the PTO main clutch 97 is allowed to mesh, and with the PTO main clutch 97 intermittence of the motive power is allowed to be performed. This PTO main clutch 97 as being shown in FIG. 5, positioned below the first high-and-low clutch 24 and the second high-and-low clutch 25, and is cooled and lubricated with the lubrication oil which collects in the inner part of the transmission case 8.

On the first PTO shaft 95 on which the PTO main clutch 97 is installed, as being mentioned next, the PTO peed-changing part 157 is provided.

The first PTO gear 98, the second PTO gear 99 and the fifth synchro-small-gear 100 and fifth synchro-large gear 101 of the fifth synchro-change 151 are installed, anchored to the second PTO shaft 104 are the twentieth gear 102, the twenty-third gear 152, the twenty-first gear 103 and the twenty-fourth gear 153, and by the counter shaft 106 the PTO reverse rotation gear 105 is supported thereon.

At the third PTO shaft 107 the second speed is yielded in case the first PTO gear 98 is slided and allowed to mesh with the twentieth gear 102, the rotation of the first PTO shaft 95 transfers to the third PTO shaft 107 via the second PTO gear 99 and the twenty-third gear 152 so as to gain the fourth speed in case the first PTO gear 98 is slided and allowed to mate with the second PTO gear 99, transmission is carried out from the fifth synchro-small-gear 100 to the twenty-first gear 103 so as to gain the first speed in case the fifth synchro-change 151 is linked to the fifth synchro-small-gear 100, transmission is carried out from the fifth synchro-large-gear 101 to the twenty-fourth gear 153 so as to gain the third speed in case the fifth synchro-change 151 is linked to the fifth synchro-large-gear 101, and the rotation of the first PTO shaft 95 is transmitted from the first PTO gear 98 to the twentieth gear 102 through the PTO reverse rotation gear 105 and transfers to the third PTO shaft 107 so as to gain the reversal rotation in case the PTO reverse rotation gear 105 is allowed to mesh with the first PTO gear 98 and the twentieth gear 102.

In addition, as being shown in FIG. 2 and FIG. 5, the first PTO gear 98, the second PTO gear 99 and the fifth synchro-change 151 are arranged between and below the said first high-and-low clutch 24 and second high-and-low clutch 25, and the first synchro-change 42 and second synchro-change 36.

The rotation of the third PTO shaft 107 is transmitted to the fifth PTO shaft 108 via the fourth PTO shaft 156, and drives the first PTO output gear 109, the second PTO output gear 110 and the PTO output shaft 111 further with speed-reduction.

As being shown in FIG. 4, at the left and right center of the transmission case 8 the input shaft 21 and the fourth front wheel driving shaft 86 are positioned, and the positions of the first high-and-low clutch 24, the high speed transmission shaft 32 and the fourth PTO shaft 156, and those of the second high-and-low clutch 25, the low speed transmission shaft. 34 and the auxiliary speed changing shaft 53 are arranged with left and right symmetry.

In addition, with the arrangement of the fourth PTO shaft 156, the auxiliary speed-changing shaft 53 and the fourth front wheel driving shaft 86, a roughly isosceles triangle in front view is gained at an inner part lower position of the transmission case 8.

Figure 8:
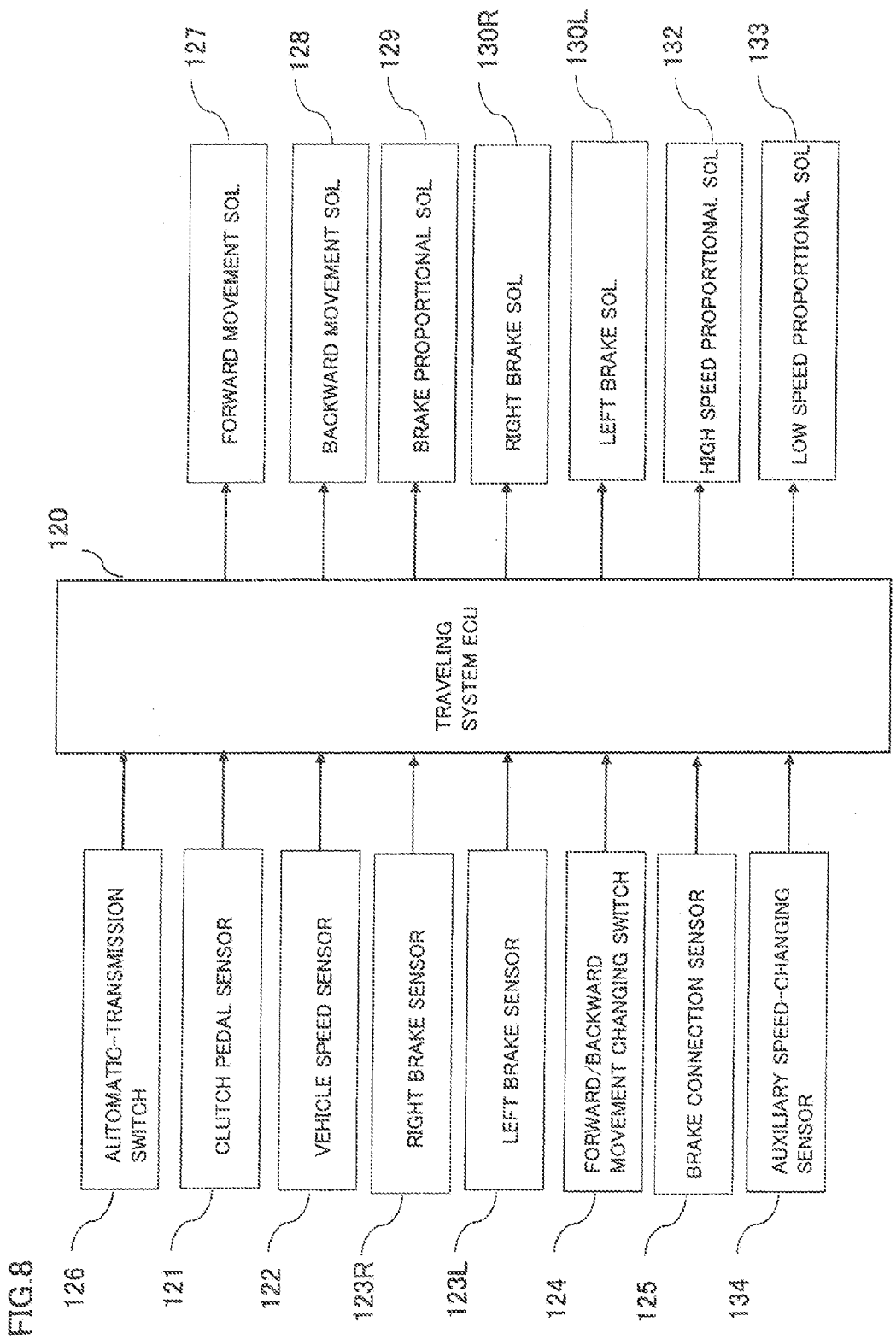
FIG. 8 is an automatic controlling block diagram of an embodiment of the present invention.

FIG. 8 is a controlling block diagram of automatic controlling which controls speed-changing inside the transmission case 8, and the controlling data inputs to the traveling system ECU 120 are the ON-OFF signal from the clutch pedal sensor 121, the traveling speed of the vehicle speed sensor 122, the ON-OFF signal of the right brake sensor 123R, the ON-OFF signal of the left brake sensor 123L, the changing signal of the forward/backward movement changing switch 124, the ON-OFF signal of the brake connection sensor 125, and the ON-OFF signal of the automatic-transmission switch 126.

The controlling outputs from the traveling system ECU 120 are the operating signal to the forward movement solenoid 127 and backward movement solenoid 128, the operating signal to the brake proportional solenoid 129, the operating signal to the right brake solenoid 130R and left brake solenoid 130L, and the operating signal to when high speed proportional solenoid 132 and low speed proportional solenoid 133.

Next, descriptions are given regarding the braking controlling.

As being mentioned in the aforesaid, when stepped upon, the left brake pedal 19L and the right brake pedal 19R allow, respectively, the brakes 135 at the stepping side to operate and thereby turning to the operating side thereof is carried out.

And, in case the brake connection sensor 125 detects that the left brake pedal 19L and the right brake pedal 19R are connected with the brake connection rod 94, and it is detected that the automatic-transmission switch 126 is allowed to be ON, then the "automatic-transmission brake operating state" is gained. In this state, the automatic-transmission displaying lamp 146 of the displaying lamp panel 145 is turned on. In addition, when the brake connection sensor 125 is in a disconnection state, the automatic-transmission displaying lamp 146 is turned on and off and informs that the "automatic-transmission brake operating state" is not functioning. The "automatic-transmission brake operating state" is one such that the stopping and launching of the machine body can be carried out even in case the clutch pedal is not stepped on.

In addition, even in case the main key switch is allowed to be stopped, since the ON state is memorized in a case where the automatic-transmission switch 126 is ON, the "automatic-transmission brake operating state" is gained in case the main key switch is allowed to be on again, and the automatic-transmission displaying lamp 146 is turned on. At this time, when the brake connection sensor 125 is in a disconnection state, the automatic-transmission displaying lamp 146 is turned on and off.

During traveling, in case the right brake pedal 19R or the left brake pedal 19L is stepped upon in the automatic-transmission brake operating state, namely, the left and right, brake pedals 19L and 19R are stepped upon at the same time, then the right brake sensor 123R or the left brake sensor 123L detects stepping manipulation of the brake pedal. The clutch at the selected side, being the forward movement clutch 48a of the said forward/backward movement clutch 48 or the backward movement clutch 48b, becomes in a low pressure state (a half clutch state). In this half clutch state the left and right brakes 135 are allowed to operate and the machine body is allowed to be in a stopping state. When the brake pedals are stepped on, the low pressure warning lamp 147 of the displaying lamp panel 145 is allowed to be turned one. The right brake sensor 123R and the left brake sensor 123L are ON-OFF type sensors.

Since the oil temperature becomes high in case this low pressure stopping state is continued long (about 2 minutes), the lamp-turning-on state of the said low pressure warning lamp 147 is allowed to be a lamp-turning-on-off state so as to inform the manipulator. At this time, in case stepping manipulation of the clutch pedal 1002 is carried out, or the forward/backward movement lever 10 is allowed to be at the neutral position, then the low pressure state of the clutch at the selected side, being the forward movement clutch 48a of the forward/backward movement clutch 48 or the backward movement clutch 48b, is released, and a complete neutral state is gained from the half clutch state. At this time, the automatic-transmission displaying lamp 146 is turned off.

During stopping of the machine body in the "automatic-transmission brake operating state," for carrying out launching again, in case the foot is allowed to dismount from the brake pedals and the brake pedals are allowed to be in an opening state, then response is good and launching is started smoothly, since motive power propagation is carried out in a state of the said low pressure stopping state (the half clutch). Thereafter, the pressure raising is carried out with the pressure gradually raised little by little, and the clutch is completely joined after stipulated time. When faster acceleration is desired, by stepping on the accelerator pedal 18 and allowing the engine rotation speed to rise, rapid acceleration can be carried out.

At the time of launching in an initial state, when the auxiliary speed-changing lever 15 is at the neutral position, the automatic-transmission switch 126 is allowed to be ON and stepping manipulation of the brake pedals is carried out. And, the clutch pedal 1002 is stepped upon and speed-changing manipulation of the auxiliary speed-changing lever 15 is carried out. Speed-changing manipulation of the main speed-changing lever 14 is also carried out. Thereafter, the forward/backward movement lever 10 is manipulated for forward movement or backward movement. And, the foot is allowed to dismount from the clutch pedal 1002 and the clutch pedal 1002 is opened. In this state, gained is the state where the machine body is stopping in the "automatic-transmission brake operating state."

The configuration is allowed to be such that in the "automatic-transmission brake operating state," when the brake pedals are being stepped on, in case stepping manipulation of the clutch pedal 1002 is carried out, then the "automatic-transmission brake operating state" does not function any longer.

In the "automatic-transmission brake operating state," at a time when stepping manipulation of both of the brake pedals and the clutch pedal 1002 is being carried out, in case pushing manipulation of the automatic-transmission switch 126 is carried out, then the "automatic-transmission brake operating state" is released and does not function any longer.

In the "automatic-transmission brake operating state," at a time when stepping manipulation of both of the brake pedals and the clutch pedal 1002 is not being carried out, in case pushing manipulation of the automatic-transmission switch 126 is carried out, then the "automatic-transmission brake operating state" is not released.

In the "automatic-transmission brake operating state," at a time when the brake pedals are not being stepped upon for stopping, in case the brake connection sensor 125 becomes in a disconnection state, then the function of the "automatic-transmission brake operating state" is temporarily suspended.

The configuration is allowed to be such that in the "automatic-transmission brake operating state," at a time when the brake pedals are being stepped upon for stopping, even in case the brake connection sensor 125 becomes in a disconnection state, the function of the "automatic-transmission brake operating state" is not temporarily suspended. The configuration is allowed to be such that thereafter, in case stepping manipulation of the brake pedals is opened, then the function of the "automatic-transmission brake operating state" is temporarily suspended. Note that the configuration is allowed to be such that, in case the left brake pedal 19L and the right brake pedal 19R get connected again when stepping manipulation of the brake pedals is opened, then the function of the "automatic-transmission brake operating state" is not allowed to be temporarily suspended.

At a time when the function of the "automatic transmission brake operating state" is being temporarily suspended, even in case pushing manipulation of the automatic-transmission switch 126 is carried out, the function of the "automatic-transmission brake operating state" is maintained.

When the function of the "automatic-transmission brake operating state" is on, and stopping is not being carried out with the brake pedals, the automatic-transmission displaying lamp 146 is turned one. It is turned on and off in case stopping is carried out with the brake pedals. In addition, at a time when the "automatic-transmission brake operating state" function is off, or the "automatic-transmission brake operating state" function is being temporarily suspended, it is turned off.

When the function of the "automatic-transmission brake operating state" is on, and stopping is carried out with the brake pedals, the low pressure warning lamp 147 is turned on and off. In case the stopping state of the brake pedals continues for 2 minutes or more, then it is turned on and off with high speed.

Figure 9:
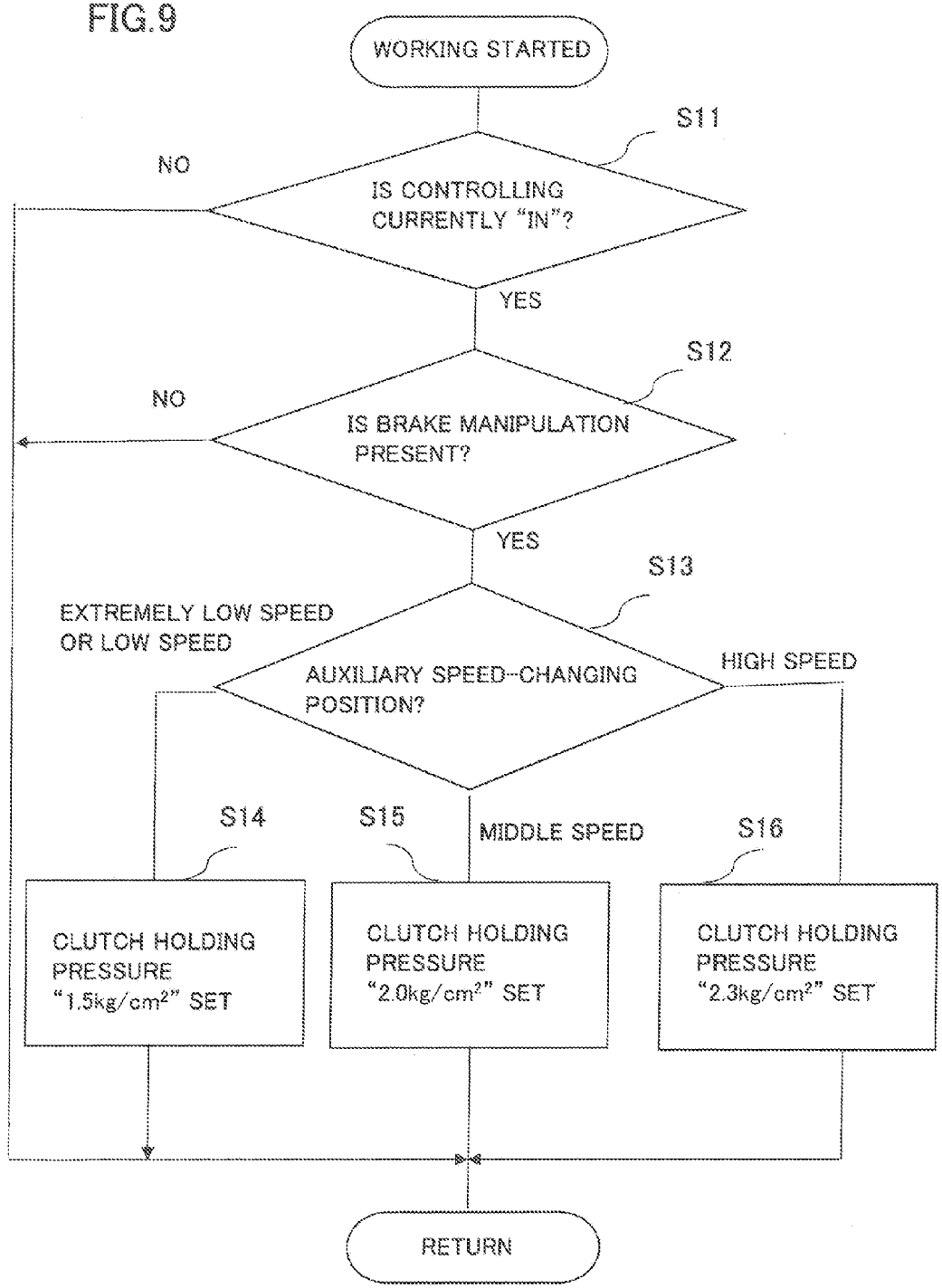
FIG. 9 is a controlling flowchart diagram of the clutch holding pressure of an embodiment of the present invention.
Figure 13:
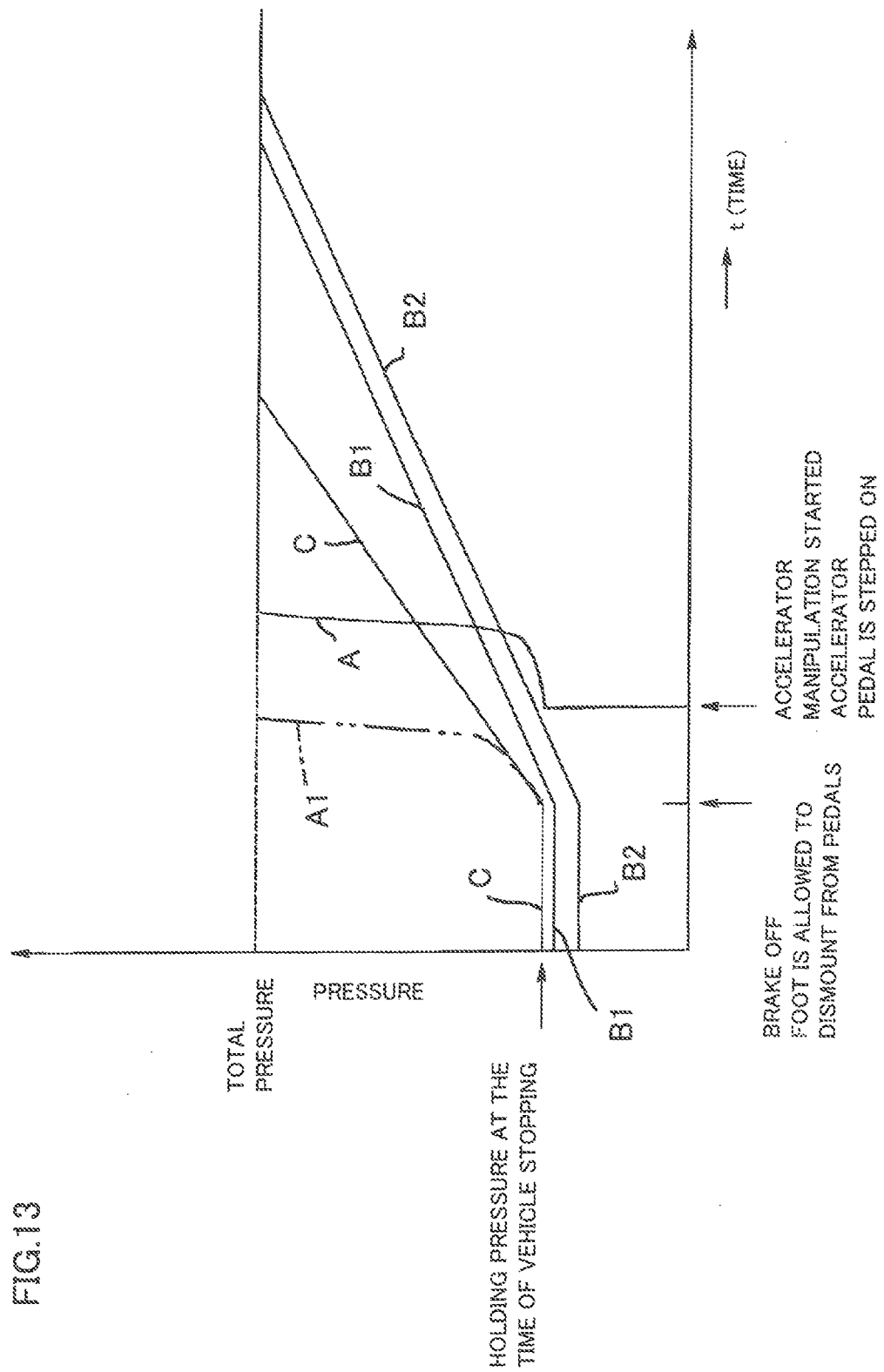
FIG. 13 is a graph of the total pressure reverting of the forward/backward movement clutch operating-oil-pressure of an embodiment of the present invention.

The low pressure stopping pressure of the forward/backward movement clutch 48 in the automatic-transmission brake operating state is, as being shown in FIG. 9, with the speed-changing position of the auxiliary speed-changing lever 15 read in with the auxiliary speed-changing sensor 134, modified in response to the speed-changing position thereof (Steps S11-S13). Namely, it is allowed to be 1.5 kg/cm$^2$ at the extremely low speed and the low speed (Step S14), 2.0 kg/cm$^2$ at the middle speed (Step S15) and 2.3 kg/cm$^2$ at the high speed (Step S16), and feedback controlling is performed. The low pressure stopping pressure is enabled to be altered with an external communication device and the like. This feedback controlling of the clutch pressure is performed after prescribed time after the controlling output. In FIG. 13, this low pressure holding state is shown. B1 shows the low pressure holding in a case where the speed-changing position of the auxiliary speed-changing lever 15 is the middle speed position. B2 shows the low pressure holding in a case where the speed-changing position of the auxiliary speed-changing lever 15 is the extremely low speed position or the low speed position. C shows the low pressure holding in a case where the speed-changing position of the auxiliary speed-changing lever 15 is the high speed position, Like this, since holding is carried out with low pressure, transition from the stopping state to the traveling state can be promptly carried out.

Like this, since the low pressure holding pressure is allowed to be higher as the auxiliary speed-changing is of higher speed, launching can be smoothly carried out when launching is carried out again.

For this feedback controlling, the configuration may be allowed to be such that in a case where pressure sensors are installed on both of the forward movement side and backward movement side of the forward/backward movement clutch 48, the feedback controlling is performed with respective pressure sensors, and in a case where there is no pressure sensor on the one side (the backward movement side), the feedback controlling is performed with the latest value of the pressure sensor on the other side (the forward movement side). By means of this, a configuration at a low price is gained.

When the vehicle speed exceeds a predetermined speed (3 km/h) when the brake pedals are stepped on, by allowing the first high-and-low clutch 24 and the second high-and-low clutch 25 to be off for a predetermined time (about 1 second) speed-reduction can be smoothly started, since the motive power from the engine become cut off for 1 second. And, until the vehicle speed becomes the predetermined speed (3 km/h) or less, the off state of the first high-and-low clutch 24 and second high-and-low clutch 25 is maintained for a sufficient time not limited to 1 second.

At a time when the brake pedals are stepped on, in a case where the main speed-changing is the speed or more, by allowing the 4$^{th}$ speed to be automatically yielded, smooth speed-reduction and stopping can be carried out. At this time, since the position of the main speed-changing lever 14 is the 5$^{th}$ speed position or more, the configuration is allowed to be such that in case the accelerator pedal 18 is stepped upon and the indication value thereof becomes 1350 rpm or more (traveling started again), then restoration to the original speed-changing position (the position of the main speed-changing lever 14) is carried out with level-by-level speed-increasing. Note that, in case there is manipulation of the auxiliary speed-changing, then speed-increasing is released. And, in case the position of the main speed-changing lever 14 and the position of the speed-changing level of the main speed-changing inside the transmission case coincide, then speed-increasing is released, and thereafter transition to the speed-changing by speed-changing of the main speed-changing lever 14 is carried out. In addition, in case the main speed-changing lever 14 is manipulated before the position of the main speed-changing lever 14 and the position of the speed-changing level of the main speed-changing inside the transmission case coincide, then the speed-changing level of the main speed-changing inside the transmission case is changed so that the speed-changing position thereof is yielded, where speed-increasing/reduction may be carried out level by level, and speed-changing may be carried out all at once. At this time, joining of the oil hydraulic clutches of the main speed changing is allowed to be sluggish and speed-changing shock is prevented.

The configuration is allowed to be such that at a time when, in the automatic-transmission brake operating state, the brake pedals are stepped on and vehicle stopping is being carried out, the pressure raising of the forward/backward movement clutch 48 after the foot is allowed to dismount from the brake pedals is carried out with pressure raising curves allowed to be different depending on the positions of the auxiliary speed-changing lever 15 (FIG. 13). At this time, the configuration is allowed to be such that in case there is manipulation of the accelerator pedal, then the pressure raising is carried out with another pressure raising curve. And, the configuration is allowed to be such that the pressure raising curve at the time when the foot is simply allowed to dismount from the brake pedals, and the pressure raising curve at the time when stepping manipulation of the accelerator pedal 18 is carried out are compared, and the pressure raising is carried out with the higher pressure raising curve selected.

At a time when, in the automatic-transmission brake operating state, the brake pedals are stepped on and vehicle stopping is being carried out, in case there is stepping manipulation of the clutch pedal 1002 (the indication pressure of the forward/backward movement clutch 48 is zero for cutting off the motive power), then the lower indication pressure, namely, the indication pressure of the clutch pedal 1002 is selected.

In addition, as in the aforementioned, at a time when the pressure raising curve at the time when the foot is simply allowed to dismount from the brake pedals, and the pressure raising curve at the time when stepping manipulation of the accelerator pedal 18 is carried out are compared, and the pressure raising is being carried out with the higher pressure raising curve selected, in case there is stepping manipulation of the clutch pedal 1002 (the indication pressure of the forward/backward movement clutch 48 is zero for cutting off the motive power), then, the lower indication pressure, namely, the indication pressure of the clutch pedal 1002 is selected. In addition, since the clutch pedal sensor 121 of the clutch pedal 1002 is a position sensor, the configuration is such that the indication pressure to the forward/backward movement clutch 48 is able to be linearly altered in response to the stepping quantity thereof. Also in this case, the lower indication pressure is selected and output.

In the automatic-transmission brake operating state, even in case there is an ON signal of the clutch pedal sensor 121, that is to say, stepping of the clutch pedal, the first high-and-low clutch 24 and the second high-and-low clutch 25 are not allowed to operate and the forward/backward movement clutch 48 is allowed to carry out off operation.

Even in case of the automatic-transmission brake operating state where the automatic-transmission switch 126 is pushed, in case the brake connection rod 94 is took off, then the automatic-transmission brake operating state is suspended and the forward/backward movement clutch 48 is not allowed to be in the low pressure stopping state.

Figure 10:
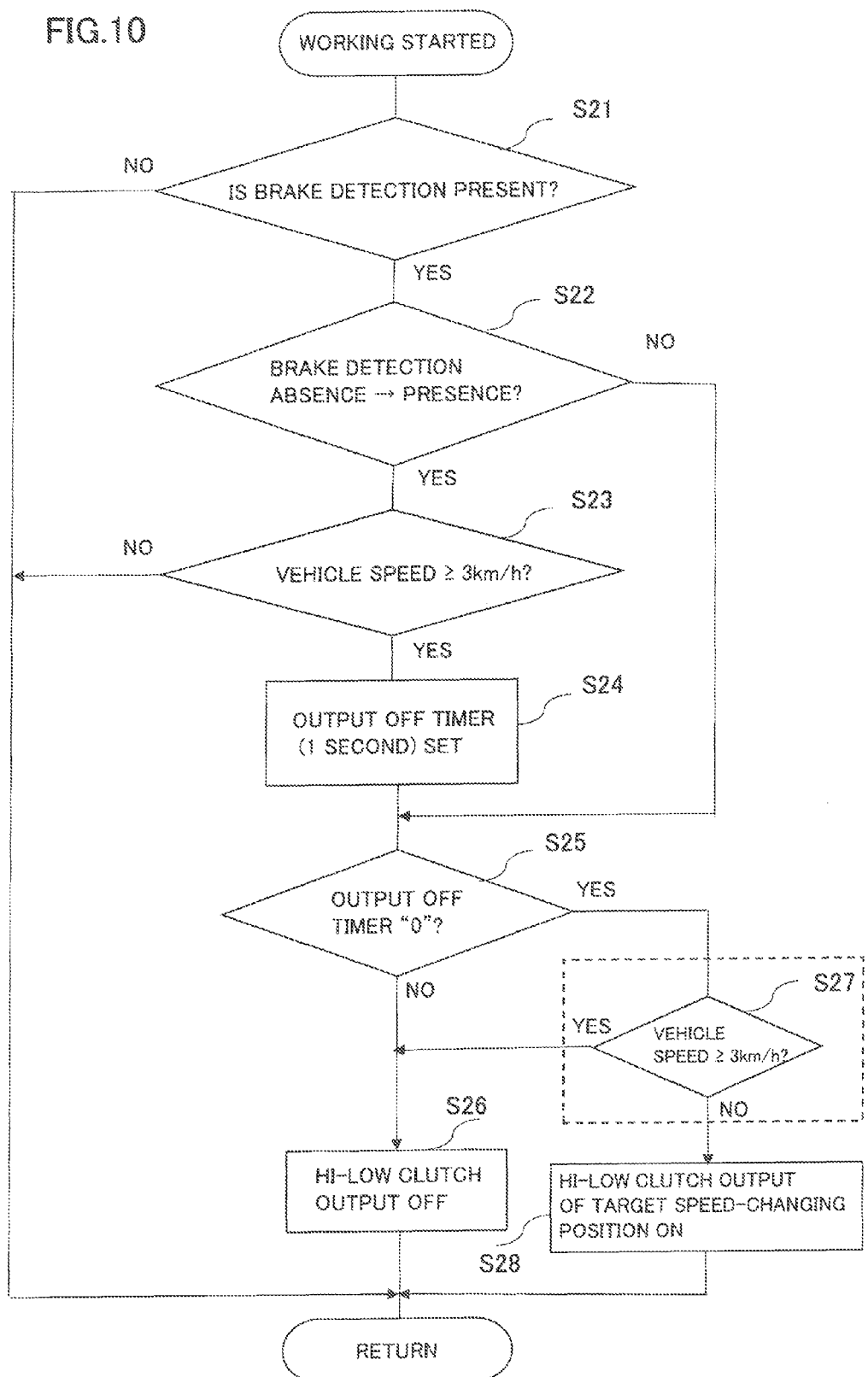
FIG. 10 is a controlling flowchart diagram of the automatic-transmission brake of an embodiment of the present invention.

As in FIG. 10, when in the automatic-transmission brake operating state the right brake pedal 19R or the left brake pedal 19L is stepped on, the forward/backward movement clutch 48 is allowed be in the low pressure stopping state but in a case where the vehicle speed exceeds 3 km/h, the first high-and-low clutch 24 or the second high-and-low clutch 25, being joined, is allowed to be off for 1 second (Steps S21-S26) and if the vehicle speed still exceeds 3 km/h (Step S27), the clutch of is allowed to be sustained and cut off the motive power until the vehicle speed becomes 3 km/h or less (Step S28).

In case the automatic-transmission switch 126 is allowed to be OFF in a case where all of the clutch pedal sensor 121, the right brake sensor 123R and the left brake sensor 123L are ON or OFF, then the automatic-transmission brake operating state is released.

Figure 11:
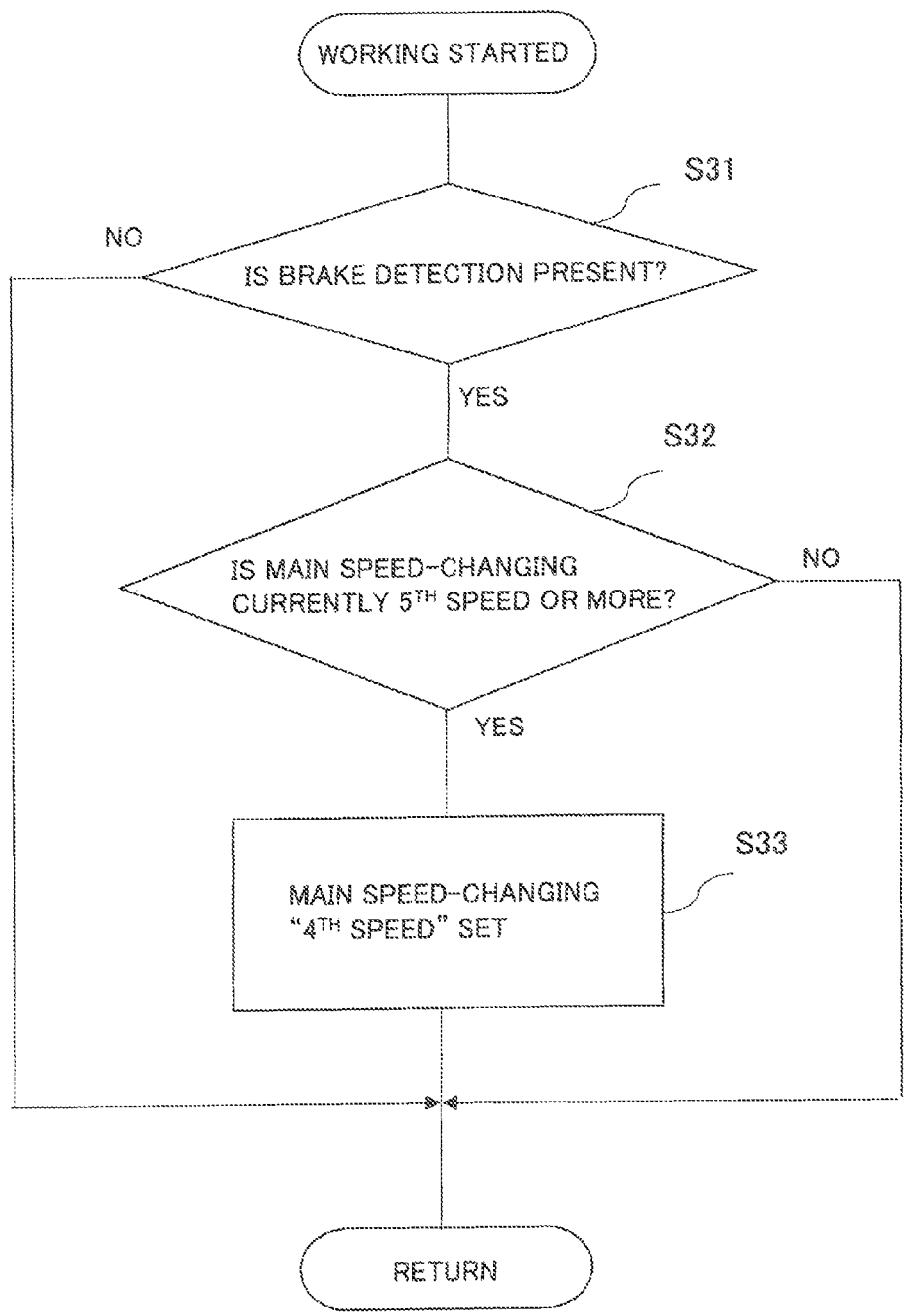
FIG. 11 is a speed-changing level controlling flowchart diagram at the time of brake of an embodiment of the present invention.
Figure 12:
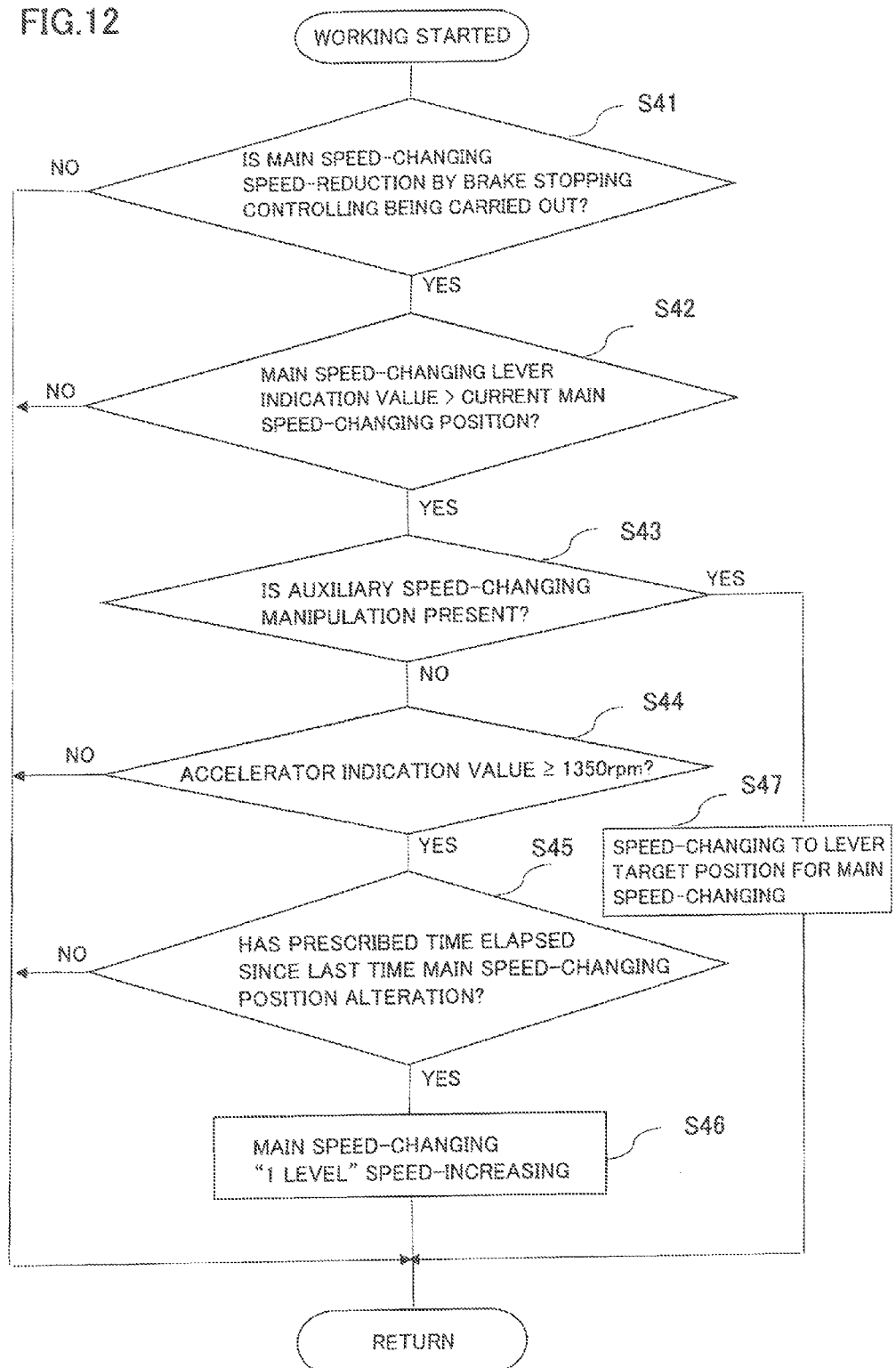
FIG. 12 is a controlling flowchart diagram at the time of automatic-transmission brake releasing of an embodiment of the present invention.

As in FIG. 11, in case the automatic-transmission stopping is performed with the traveling speed-changing position of the main speed-changing lever 14 being the 5$^{th}$ speed position or more (Steps S31 and S32), then the speed-changing level is automatically altered to yield the 4$^{th}$ speed (Step S33). In addition, in case traveling is started in a case where the traveling speed-changing position of the main speed-changing lever 14 is the 5$^{th}$ speed position or more then, as in FIG. 12, the level raising is carried out level by level to revert to the original speed-changing level in case the engine rotation speed becomes 1350 rpm (Steps S41-S46). And, the automatic speed-changing is released in case reverting to the original speed-changing level is carried out. The automatic reverting is aborted in case the auxiliary speed-changing is altered on that occasion (Steps S43 and S47).

In case all of the right brake sensor 123R and the left brake sensor 123L are in the OFF state and the brake connection sensor 125 becomes OFF, then the automatic-transmission brake operating state is suspended, but the automatic-transmission brake operating state is not released even in case either the right brake sensor 123R or the left brake sensor 123L is ON, namely, in the stopping state and the brake connection sensor 125 is allowed to be ON. But, in case the right brake sensor 123R and the left brake sensor 123L become OFF with the brake connection sensor 125 being allowed to be OFF, then the automatic-transmission brake operating state is released.

Figure 6:
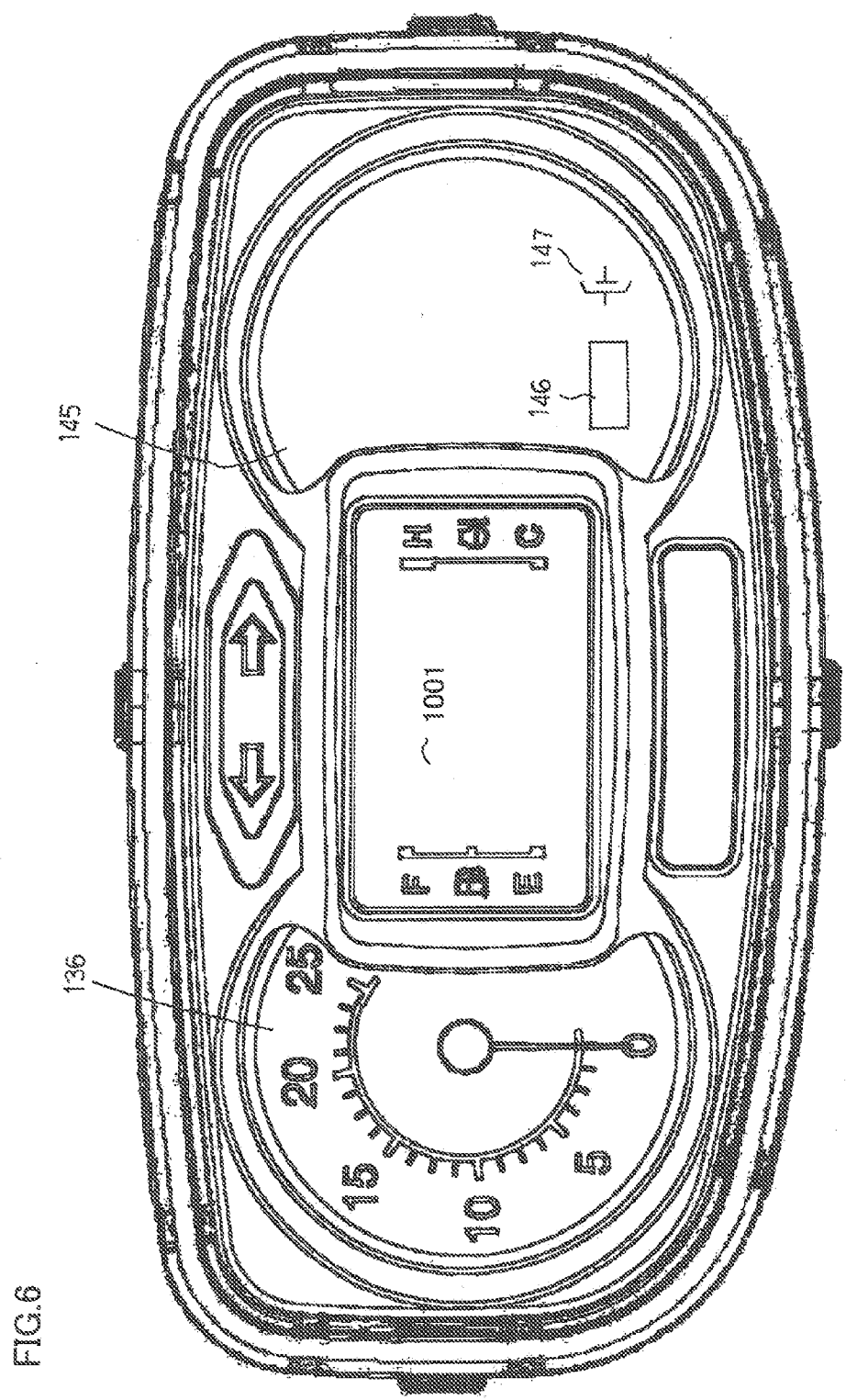
FIG. 6 is a front view of the front panel of an embodiment of the present invention.

The automatic-transmission displaying lamp 146 and the low pressure warning lamp 147 shown in FIG. 6 are turned on under the next conditions.

The automatic-transmission displaying lamp 146 is turned on in the automatic-transmission brake operating state, and is turned off in case the automatic-transmission brake operating state is released or suspended.

The low pressure warning lamp 147 becomes turned on or normally turned on and off in case automatic-transmission brake stopping is yielded in the automatic-transmission brake operating state, in case this state is yielded for 2 minutes or more, then is turned on and off with high speed and warns that automatic-transmission brake should not be continued long, and is turned off in the other states.

Shown in FIG. 13 are the pressure raising patterns of the forward/backward movement clutch 48, and A is for a case where the accelerator pedal 18 is stepped upon and launching is carried out, or for a case where the accelerator pedal 18 is stepped upon and launching is carried out in a case where restoration from the brake stopping state to traveling is carried out, so the predetermined total pressure is allowed to be yielded in a short time B1 is for a case where restoration from the brake stopping state to traveling is carried out with brake releasing in a case where the speed-changing position of the auxiliary speed-changing lever 15 is the middle speed position. B2 is for a case where restoration from the brake stopping state to traveling is carried out with brake releasing in a case where the speed-changing position of the auxiliary speed-changing lever 15 is the extremely low speed position or the low speed position. C is for a case where restoration from the brake stopping state to traveling is carried out with brake releasing in a case where the speed-changing position of the auxiliary speed-changing lever 15 is the high speed position. And, in case the accelerator pedal 18 is stepped on in the middle of restoration to the total pressure with brake releasing, then swift pressure raising is carried out with transition to the pressure raising pattern of A. By means of this, since pressure raising is carried out with higher pressure raising patterns as the auxiliary speed-changing is of higher speed, the speed being a target can be attained promptly.

The configuration is allowed to be such that, in a case where stepping manipulation of the accelerator pedal 18 is carried out, with respect to the said pressure raising pattern of A, the pressure raising pattern of B1 or the pressure raising pattern of B2 or the pressure raising pattern of C is compared so that the pressure raising is carried out with the higher pressure selected.

In case stepping manipulation of the accelerator pedal 18 is carried out right after stepping manipulation of the brake pedals is released, then the pressure raising curve A1 is selected but, in case time has passed to some extent after stepping manipulation of the brake pedals is released, since pressure raising has already progressed for the pressure raising pattern of B1 or the pressure raising pattern of B2 or the pressure raising pattern of C, then the pressure raising pattern of B1 or the pressure raising pattern of B2 or the pressure raising pattern of C gains a higher pressure than the pressure raising pattern of A, and the pressure raising pattern of B1 or the pressure raising pattern of B2 or the pressure raising pattern of C is selected. Note that, in case the pressure raising pattern of A gets higher with the lapse of time, then the pressure of the pressure raising pattern of A is selected and output.

The configuration is allowed to be such that the said pressure raising pattern and the low pressure holding pressure (the low pressure operating pressure) are modified in response to the position of the auxiliary speed-changing, but they may be modified in response to the position of the main speed-changing. In addition, they may be modified on the combination of the auxiliary speed-changing and the main speed-changing. Also in this case, a higher pressure is allowed to be gained for a higher speed.

The configuration is such that the said main speed-changing lever 14 is able to be manipulated from the 1$^{st}$ speed position to the 8$^{th}$ speed position in a straight line from the neutral position toward the machine body front side. In addition, in case the main speed-changing lever 14 is displaced from the neutral position to the "automatic speed-changing position" on the machine body rear side, then the automatic speed-changing is started. The configuration is allowed to be such that the displacement of the main speed-changing lever 14 to this "automatic speed-changing position" is carried out in such a way that the displacement is carried out once in the lateral direction (the machine body right direction or the left direction) and then the displacement is carried out to the machine body rear side. This is for preventing erroneous manipulation.

In case the main speed-changing lever 14 is allowed to be at the "automatic speed-changing position," then setting to the 4$^{th}$ speed is carried out for the main speed-changing inside the transmission case. The clutch pedal is stepped on and selection is carried out for the auxiliary speed-changing. The forward/backward movement lever 10 is allowed to be at the forward movement position. Thereafter, traveling is started in case the foot is allowed to dismount from the clutch pedal. In case the accelerator pedal 18 is gradually stepped upon, then speed-increasing for the vehicle speed is gradually carried out along with the engine rotation. And, in accordance with the elevation of the engine rotation speed, speed-increasing is gradually carried out for the main speed-changing inside the transmission case. In case stepping of the accelerator pedal 18 is allowed to be less, then speed-reduction is gradually carried out for the main speed-changing. In case the clutch pedal 1002 is stepped upon, and the brake pedals are stepped upon so that vehicle stopping is allowed to be carried out for the machine body, then restoration to the 4$^{th}$ speed is carried out for the main speed-changing. In addition, even before launching and during traveling, in case the forward/backward movement lever 10 is allowed to be at the backward movement position, then the automatic speed-changing function is temporarily suspended and the 4$^{th}$ speed is maintained for the main speed-changing.

What is claimed is:

1. A tractor, comprising:
   an engine;
   a forward/backward movement clutch which is provided on a motive power transmission route from the engine to one or more traveling apparatuses, and is configured to carry out changes among forward movement, backward movement and neutral;
   one or more brake pedals;
   a control unit which is configured to allow, in association with stepping manipulation of the one or more brake pedals, one or more brakes to operate on the one or more traveling apparatuses and allow operating-pressure of the forward/backward movement clutch to lower from a total pressure; and
   one or more sensors which are configured to detect the stepping manipulation of the one or more brake pedals, wherein
   the control unit is configured to allow, in response to a detection result of the one or more sensors, the one or more brakes to operate on the one or more traveling apparatuses and allow the operating-pressure of the forward/backward movement clutch to lower from the total pressure,
   when a machine body is in a traveling stopping state, the forward/backward movement clutch is held with operating-pressure of a predetermined low pressure,
   the operating-pressure of the predetermined low pressure is set higher, as a speed-changing position of an auxiliary speed-changing lever is at a higher speed position,
   on an occasion when the stepping manipulation of the one or more brake pedals is released, the operating-pressure of the forward/backward movement clutch is restored to the total pressure,
   a pressure raising rate of restoring the operating-pressure of the forward/backward movement clutch to the total pressure is set higher, as the speed-changing position of the auxiliary speed-changing lever is at a higher speed position, and
   in case, after the stepping manipulation of the one or more brake pedals is released, stepping manipulation of an accelerator pedal is performed, then the operating-pressure of the forward/backward movement clutch is restored to the total pressure with a pressure raising rate which is higher than the pressure raising rate on the occasion when, after the stepping manipulation of the one or more brake pedals is released, the stepping manipulation of the accelerator pedal is not performed.

* * * * *